United States Patent Office 2,852,548
Patented Sept. 16, 1958

2,852,548
PROCESS FOR THE PRODUCTION OF SALTS OF ARYLOXYALKANOL - SULFURIC ACID SEMI-ESTERS

Wolfgang Gündel, Dusseldorf-Oberkassel, and Heinz Linden, Dusseldorf, Germany, assignors to Henkel & Cie. G. m. b. H., Dusseldorf-Holthausen, Germany, a corporation of Germany No Drawing. Application June 9, 1955
Serial No. 514,362

Claims priority, application Germany June 14, 1954

18 Claims. (Cl. 260—458)

This invention relates to a process for the production of salts of aryloxyalkanol-sulfuric acid semi-esters of the general formula $$Ar-O-R-O-SO_2-OX$$

wherein Ar is an aromatic radical whose aromatic nucleus is attached directly to the oxygen atom, R is an aliphatic radical, and X is a salt-forming cation, preferably an alkali metal ion.

Compounds of this class are known to be valuable selective weed-killing agents, particularly if one or more halogen atoms are attached to the aromatic nucleus. However, their production by direct sulfation of aryloxyalkanols, as heretofore practiced, presents considerable technical difficulties, because the sulfation must be carried out at very low temperatures while many of the salts produced thereby have a relatively high crystallization point. The methods heretofore employed, therefore, necessitated the use of complicated and awkward apparatus which increased the costs of production to very high levels.

It is an object of the present invention to provide a process for the production of salts of aryloxyalkanol-sulfuric acid semi-esters which can be carried out in relatively simple apparatus and therefore reduces the cost of production of these salts.

Other objects and advantages of the present invention will become apparent as the description thereof proceeds.

We have found that valuable water-soluble salts of aryloxyalkanol-sulfuric acid semi-esters can be produced in a very simple manner by reacting aromatic oxy-compounds with halogenated alkanol-sulfuric acid semi-esters in the presence of acid-binding agents according to the following reaction equation:

$$Ar-O-X+Y-R-O-SO_2-O-X=$$
$$Ar-O-R-O-SO_2-OX+XY$$

In this equation Ar, R and X represent the radicals above indicated, and Y represents a halogen atom. Radical X in the aromatic oxy-compound and in the halogenated alkanol-sulfuric acid semi-ester may be different salt-forming cations, but it is preferred that it be the same cation of an inorganic base, such as, for example, alkali metal hydroxides, ammonia, mono-, di- or tri-ethanolamine, tetraethylol-ammonium hydroxide, and the like.

The halogenated alkanol-sulfuric acid semi-ester salts used as one of the reactants contain chlorine or bromine as one of the halogen atoms. Examples of these are 2-chloroethyl-sodium sulfate, 4-chlorobutyl-sodium sulfate, 6-chlorohexyl-sodium sulfate, and the corresponding bromo-compounds. The aliphatic radical R contains preferably from 2 to 6 carbon atoms in the aliphatic nucleus, but it may, in addition, also carry substituent atoms or radicals such as heteroatoms and heteroatom groups.

Such halogenated alkanol-sulfuric acid semi-ester salts can be produced according to known methods by sulfating halogenated aliphatic alcohols, such as, for example, 2-chloroethanol, 4-chlorobutanol, 6-chlorohexanol, or the corresponding brominated alcohols, and subsequently neutralizing the sulfated alcohol compound with alkalis, for example with alkali metal hydroxides.

We have found that the halogenated alkanol-sulfuric acid semi-ester salts above described are sufficiently stable in alkaline media, even at high temperatures, to exchange their halogen atom with the aryloxy-radical without an accompanying cleavage of the sulfuric acid ester linkage. The very smooth reaction, which is not accompanied by appreciable amounts of side reactions, produces good yields of the desired aryloxyalkanol-sulfuric acid semi-ester salts, even in water as the solvent. This smooth course could not have been expected, since, under the above reaction conditions, it was feared that the sulfate-group would react with the phenolate and thereby form considerable amounts of water-insoluble diaryloxyalkanes.

Aromatic compounds which are suitable as the other reactant in the process according to the present invention are mono- or poly-nuclear aromatic compounds containing up to 20 carbon atoms in the aromatic nucleus with a hydroxyl-group attached directly to the aromatic nucleus. Such compounds may also carry substituents such as heteroatoms, heteroatom-groups, and particularly halogen atoms, such as chlorine or bromine. Specific examples of such compounds are:

Phenol
2-chlorophenol
4-chlorophenol
2,4-dichlorophenol
2,4,6- or 2,4,5-trichlorophenol
4-bromophenol
2,4-dibromophenol
2,4,6-tribromophenol
2-cresol
3-cresol
4-cresol
4-chloro-2-cresol
4,5-dichloro-2-cresol
4,6-dichloro-2-cresol
4-chloro-3-cresol
4,6-dichloro-3-cresol
2-chloro-4-cresol
2,6-dichloro-4-cresol
2,4-xylenol
2,5-xylenol
2,6-xylenol
3,5-xylenol
6-chloro-2,4-xylenol
4-chloro-2,5-xylenol
4-chloro-2,6-xylenol
4-chloro-3,5-xylenol
2,4,6-trichloro-3,5-xylenol
4-nitrophenol
pseudocumenol
mesitol
isopropyl phenol
carvacrol
thymol
4-butylphenol
4-isoamyl phenol
4-isoheptyl phenol
4-isododecyl phenol
4-phenyl phenol
4-chloro-2-phenyl phenol
4-benzylphenol
guaiacol
4-phenoxy phenol
1-naphthol
4-chloro-1-naphthol 2-naphthol
1-chloro-2-naphthol
1-bromo-2-naphthol
2,2'-dioxy-diphenyl
4,4'-dioxy-diphenyl
4,4'-dioxy-diphenyl methane
4,4'-dioxy-diphenyl propane
4,4'-dioxy-diphenyl sulfone and the like.

Acid-binding compounds, in whose presence the reaction of the aromatic oxy-compounds with the sulfuric acid semi-ester salts of halogenated alcohols takes place, are preferably sodium or potassium hydroxide, or organic bases which are capable of forming salts with the aromatic oxy-compounds. However, weaker alkalis which do not form salts with the aromatic oxy-compounds, such as, for example, alkali metal carbonates or alkaline earth metal hydroxides, may also be used. The reaction takes place best in the presence of a solvent, preferably in water. Organic solvents which may advantageously be used are oxygen-containing compounds, such as, for example, alcohols or ketones having a boiling point not higher than 120° C. at atmospheric pressure.

The reaction is carried out by admixing the reactants, preferably in equimolar ratio, and heating the mixture to temperatures between 50° C. and 150° C. In some cases, one of the reactants may be present in excess, for example in an amount equal to double the molar ratio. If the reaction is carried out in the presence of solvents, the reaction mixture is heated to the boiling point and is refluxed in order to obtain higher reaction temperatures, unless it is desired to operate at elevated pressures. The progress of the reaction can be very easily measured by a decrease in the alkalinity of the reaction mixture, or by determining the amount of halogen linked to the ionogen. It proceeds somewhat more slowly towards the end and generally requires from 4 to 10 and sometimes a greater number of hours. Yields of 90% of the theoretical yields, and above, are very easily attainable.

In those cases where the aryloxyalkanol-sulfuric acid semi-ester salt formed by the reaction is relatively insoluble in salt-containing reaction solutions, the reaction product precipitates from the reaction solution, upon cooling thereof, in a very pure and readily filterable form. Many of the semi-ester salts obtained in accordance with the reaction described above are relatively insoluble in the reaction solution, but their solubility can be controlled by a proper choice of the amount of water used as the solvent. Thus, small portions of the reaction product which remain dissolved in the mother liquor can very easily be recovered therefrom by salting them out, or by evaporating the mother liquor. Relatively soluble aryloxyalkanol-sulfuric acid semi-ester salts can be isolated from the reaction solution by evaporation or by spray-drying, and, if necessary, by redissolving the residue in a suitable organic solvent, such as, for example, alcohol, and recrystallizing the same therefrom. The products thus obtained are crystalline and free from the inorganic salts formed by the acid-binding agents during the reaction.

On an industrial scale, the practice of the present process is facilitated in that it is not necessary to isolate the halogenated alkanol semi-ester sulfates used as one of the starting materials; instead, unrefined aqueous solutions of the halogenated alkanol semi-ester sulfates, such as are obtained by reacting the corresponding halogen hydrins with sulfuric acid or chlorosulfonic acid and subsequent neutralization, may also be used, as indicated in some of the examples below.

The following examples will further illustrate our invention and enable others skilled in the art to understand the invention more completely. It is understood, however, that our invention is not limited to the examples which follow.

EXAMPLE I

*Production of phenoxyethyl-sodium sulfate*

192 parts by weight of crystalline β-chloroethyl-sodium sulfate (1 mol plus 5% excess) were added to a solution of 94 parts by weight of phenol (1 mol) in 500 parts by weight of an 8% aqueous solution of sodium hydroxide. The clear solution formed thereby was heated to the boiling point and refluxed for 8 hours. At the end of this time the reaction had gone to more than 95% completion, and only a few cubic centimeters of dilute sulfuric acid were required to completely neutralize the reaction solution. The solution was then evaporated to dryness and the solid residue was thoroughly extracted with alcohol. By concentrating or evaporating the alcohol solution, a total of 221 parts by weight of crystalline phenoxyethyl-sodium sulfate, having the formula

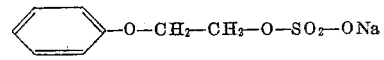

were obtained. The product was a crystalline substance of high purity and the yield corresponded to 92% of the theoretical yield.

The chloroethyl-sodium sulfate required as one of the reactants in the above example was obtained in the following manner: 121 parts by weight of ethylenechlorhydrin (1.5 mols) were added over a period of 1 hour at 0° C. to 186 parts by weight of chlorosulfonic acid (1.6 mols). The practically colorless sulfation mixture was then stirred into 500 parts by weight of a 16% aqueous solution of sodium hydroxide while cooling the vessel with ice. After adjusting the pH to a value of 8, the solution was evaporated to dryness, but care was taken not to exceed a temperature of 80° C. The β-chloroethyl-sodium sulfate formed thereby was extracted with hot alcohol from the residue, and was thus obtained with high purity and excellent yields.

EXAMPLE II

*Production of 4-cresoxyethyl-sodium sulfate*

An aqueous mixture consisting of 108 parts by weight of 4-cresol (1 mol), 40 parts by weight of sodium hydroxide (1 mol), 192 parts by weight of chloroethyl-sodium sulfate (1.05 mols) and 1500 parts by weight of water was boiled for 10 hours with reflux. At the end of this period, the pH of the reaction solution was adjusted to a value of 8 by the addition of a few cubic centimeters of 2 N sulfuric acid. Upon cooling, 75% of the 4-cresoxyethyl-sodium sulfate formed thereby crystallized out in a very pure form. That portion of the reaction product which remained dissolved in the reaction solution was recovered therefrom by evaporation and extraction with alcohol, as described in Example I. The total yield of pure salt, having the structural formula

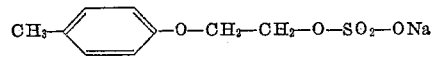

was 244 parts by weight, corresponding to 96% of the theoretical yield.

EXAMPLE III

*Production of o-cresoxyethyl-sodium sulfate*

The reaction described in Example II was repeated using the same amount of 2-cresol instead of the 4-cresol. Because of the higher solubility of the 2-cresoxyethyl-sodium sulfate formed by the reaction, the amount of water was reduced from 1500 parts by weight to 600 parts by weight. Similar to Example II, the major portion of the 2-cresoxyethyl sodium sulfate, having the structural formula

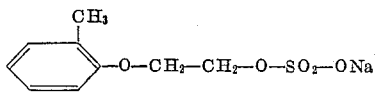

crystallized out upon cooling the reaction solution, and the total yield, including the amount recovered from the mother liquor, amounted to 92% of the theoretical yield.

EXAMPLE IV

*Production of 2,4-dichlorophenoxyethyl-sodium sulfate*

84.5 parts by weight of ethylenechlorhydrin (1.05 mols) were stirred into 128 parts by weight of chlorosulfonic acid (1.1 mols) over a period of 30 minutes at 0° C. The cold sulfonation mixture was thoroughly agitated and mixed and then permitted to pass into 1100 parts by weight of a 9% aqueous sodium hydroxide solution, while maintaining the temperature at about 0° C. Thereafter, the amount of free alkali in the reaction mixture was determined and found to be 42.3 parts by weight. After adding 163 parts by weight of 2,4-dichlorophenol (1 mol), the remaining amount of free sodium hydroxide (2.3 parts by weight) was transformed into sodium sulfate by adding a calculated amount of dilute sulfuric acid (29 parts by weight of a 10% aqueous solution of sulfuric acid). Subsequently, the reaction mixture was boiled until the gradually decreasing alkalinity of the reaction mixture indicated that the reaction was practically completed. This required boiling for about 14 to 16 hours. By evaporating or spray-drying the resulting solution, a solid residue was obtained which contained high percentages of 2,4-dichlorophenoxyethyl-sodium sulfate, having the structural formula

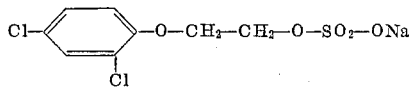

If this product is not to be used as a selective weed-killing agent in this form, it may be purified by repeated extraction with hot alcohol, whereby inorganic salts formed during the reaction are removed. In this manner 279 parts by weight of pure crystalline 2,4-dichlorophenoxyethyl-sodium sulfate were obtained, corresponding to 90% of the theoretical yield.

EXAMPLE V

*Production of 4-chloro-2-cresoxyethyl-sodium sulfate*

Repeating the preceding example but substituting 142.5 parts by weight of 4-chloro-2-cresol in place of the 2,4-dichlorophenol, 260 parts by weight of salt-free 4-chloro-2-cresoxyethyl-sodium sulfate, having the structural formula

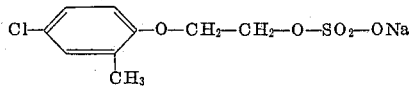

were obtained, which corresponds to 91% of the theoretical yield.

EXAMPLE VI

*Production of 4-chlorophenoxybutyl-sodium sulfate*

221 parts by weight of 4-chlorobutyl-sodium sulfate (1.05 mols), produced by sulfating 4-chlorobutanol with chlorosulfonic acid in a manner analogous to that described in Example I, were added to a solution of 128.5 parts by weight of 4-chlorophenol (1 mol) in 500 parts by weight of an 8% aqueous solution of sodium hydroxide. The resulting solution was boiled for 16 hours with reflux until the alkaline reaction of the reaction mixture practically completely disappeared. Thereafter, the solution was evaporated to dryness and the solid residue was thoroughly extracted with alcohol. 272 parts by weight of crystalline 4-chlorophenoxybutyl sodium sulfate, having the structural formula

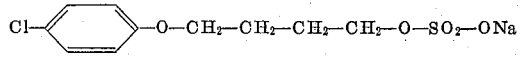

were obtained, which corresponds to 90% of the theoretical yield.

EXAMPLE VII

*Production of 2-methoxy-phenoxyethyl-sodium sulfate*

200 parts by weight of β-chloroethyl-sodium sulfate (1.1 mols) were added to a solution of 124 parts by weight guaiacol (1 mol) in 500 parts by weight of an 8% aqueous solution of sodium hydroxide. The resulting mixture was boiled for 8 hours with reflux. The reaction mixture was then evaporated to dryness and the solid residue was recrystallized from substantial amounts of alcohol to remove sodium chloride formed in the reaction. 220 parts by weight of pure 2-methoxy-phenoxyethyl-sodium sulfate, having the structural formula

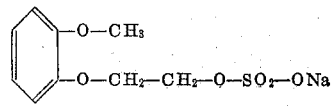

were obtained, which corresponds to 81.5% of the theoretical yield.

EXAMPLE VIII

*Production of naphthalene-1-oxyethyl-sodium sulfate*

A mixture consisting of 144 parts by weight of α-naphthol (1 mol), 200 parts by weight of β-chloroethyl-sodium sulfate (1.1 mol) and 1000 parts by weight of a 4% aqueous solution of sodium hydroxide was boiled for 8 hours with reflux, substantially as described in the preceding examples. The resulting reaction product was relatively insoluble in cold water and crystallized out, upon cooling the reaction solution, in the form of long, hair-like needles, which were filtered off. 225 parts by weight of naphthalene-1-oxyethyl-sodium sulfate, having the structural formula

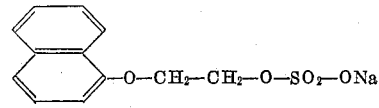

were obtained, which corresponds to 77% of the theoretical yield.

For further purification the reaction product was recrystallized from methanol. The purified product separated out in the form of colorless, brilliant leaflets.

EXAMPLE IX

*Production of β,β-diphenylpropane-4,4'-bis-oxyethyl-sodium sulfate*

114 parts by weight of β,β-diphenylolpropane (½ mol) and 200 parts by weight of β-chloroethyl-sodium sulfate (1 mol) were dissolved in 1000 parts by weight of a 4% aqueous solution of sodium hydroxide. The resulting solution was then boiled with reflux for about 16 hours. At the end of this period, the reaction had gone to 87% completion. The reaction mixture was then evaporated to dryness and the solid residue was thoroughly extracted with hot alcohol. The β,β-diphenylpropane-4,4'-bis-oxyethylsodium sulfate, having the structural formula

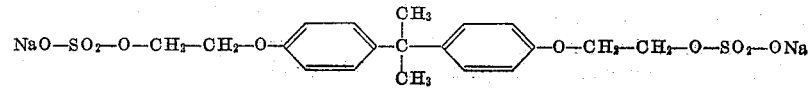

was highly soluble in water but relatively insoluble in hot or cold alcohol, so that a small amount of monosubstituted diphenylpropane formed during the reaction dissolved in the hot alcohol, while the di-substituted semi-ester salt formed as the main product remained behind as an insoluble residue. Therefore, the separation of β,β-diphenylpropane-4,4'-bis - oxyethyl - sodium sulfate from the inorganic salt by extracting with hot alcohol is not possible in this case and the theoretical yield cannot be calculated.

EXAMPLE X

*Production of 4-carboxy-phenoxyethyl-sodium sulfate*

138 parts by weight of 4-oxybenzoic acid (1 mol) and 200 parts by weight of β-chloroethyl-sodium sulfate (1.1 mols) were dissolved in 500 parts by weight of a 16% aqueous solution of sodium hydroxide (2 moles), and the resulting solution was boiled with reflux until the reaction mixture was practically neutral, which required approximately 20 to 24 hours of boiling. 183 parts by weight of a 20% aqueous solution of hydrochloric acid (1 mol) were then added to the hot reaction mixture. Upon cooling, 4-carboxy-phenoxyethyl-sodium sulfate, having the structural formula

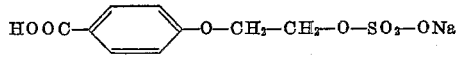

crystallized out of the reaction mixture in an amount of 220 parts by weight, corresponding to a 73% theoretical yield. The semi-ester salt was then recrystallized from water or substantial amounts of alcohol and was recovered in the form of well-defined crystals having an acid No. of 182 (calculated acid No.: 183).

EXAMPLE XI

*Production of 3,5-dimethyl-phenoxyethyl-sodium sulfate*

A mixture consisting of 122 parts by weight of 3,5-xylenol (1 mol), 188 parts by weight of β-chloroethyl-sodium sulfate (1.025 mols) and 1000 parts by weight of an 8% aqueous solution of sodium hydroxide (1 mol) was boiled with reflux until, after 8 hours, the reaction was found to have gone to 98% completion. The reaction mixture was then evaporated to dryness and the solid residue was recrystallized from alcohol. 3,5-dimethyl-phenoxyethyl-sodium sulfate, having the structural formula

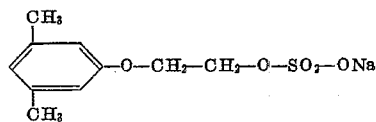

precipitated out of the alcohol solution in the form of thin, water-soluble needles, which were free from sodium chloride. The total amount of 3,5-dimethyl-phenoxyethyl-sodium sulfate obtained was 199 parts by weight, which corresponds to 74.5% of the theoretical yield.

EXAMPLE XII

*Production of 4-chloro-3,5-dimethyl-phenoxyethyl-sodium sulfate*

Repeating the preceding example, but substituting 156.5 parts by weight of 4-chloro-3,5-dimethylphenol for the 3,5-xylenol and boiling for 8 hours with reflux resulted in a mixture from which about 80% of the 4-chloro-3,5-dimethyl-phenoxyethyl-sodium sulfate, having the structural formula

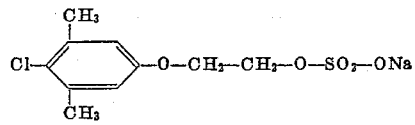

precipitated out in crystalline form due to its relative insolubility in cold water. The crystals were then filtered off and small amounts of the pure salt which remained dissolved in the reaction mixture were recovered by evaporating the mother liquor and the wash water. For further purification, the filter cake and the residue from the evaporation were recrystallized from alcohol. The total yield of 4-chloro-3,5-dimethyl-phenoxyethyl-sodium sulfate was 250 parts by weight, which corresponds to 82% of the theoretical yield.

EXAMPLE XIII

*Production of 2,4,6-tribromophenoxyethyl-sodium sulfate*

A solution of 66.2 parts by weight of 2,4,6-tribromophenol (2/10 mol) and 37.6 parts by weight of β-chloroethyl-sodium sulfate (2/10 mol plus 2.5% excess) in 133 parts by weight of a 6% aqueous solution of sodium hydroxide (2/10 mol) was boiled with reflux for 8 hours. The reaction mixture was then filtered while still hot to remove insoluble materials and the filtrate was allowed to cool. A thick crystallized sludge was formed. The crystals were filtered off and found to be 2,4,6-tribromo-phenoxyethyl-sodium sulfate, having the structural formula

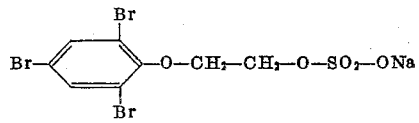

In order to obtain the same ester salt in an analytically pure form, it was recrystallized from water. The total yield of 2,4,6-tribromo-phenoxyethyl-sodium sulfate was 50.5 parts by weight, which corresponds to 53% of the theoretical yield.

EXAMPLE XIV

*Production of 2,4,6-trichloro-3,5-dimethyl-phenoxyethyl-sodium sulfate*

Substituting 2,4,6-trichloro-3,5-xylenol for the 2,4,6-tribromophenol in the preceding example, the reaction yielded 2,4,6-trichloro-3,5-dimethyl-phenoxyethyl-sodium sulfate, having the structural formula

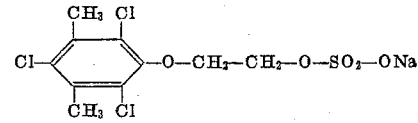

The total yield was 14.9 parts by weight, which is 17% of the theoretical yield.

While we have given examples of specific embodiments of our invention, a person skilled in the art will readily recognize that the invention is not limited to these specific embodiments, and that various changes and modifications may be made therein without departing from the spirit of our invention or the scope of the appended claims.

We claim:

1. The method of producing salts of aryloxyalkanolsulfuric acid semi-esters having the general structural formula

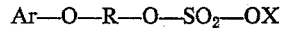

wherein Ar is an aromatic radical containing up to 20 carbon atoms, R is an aliphatic radical having 2 to 6 carbon atoms in the aliphatic chain and X is a salt-forming cation selected from the group consisting of alkali and alkaline earth metals, ammonia, ethanol amines and tetraethylol-ammonium hydroxide radicals, which comprises heating a mixture comprising a salt of an aromatic hydroxy compound, a salt of a halogenated alkanol-sulfuric acid semi-ester and an acid-binding agent, in aqueous solution, at reflux temperatures, and separating the reaction product formed thereby from the reaction mass.

2. The method of producing salts of aryloxyalkanolsulfuric acid semi-esters having the general structural formula

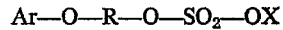

wherein Ar is an aromatic radical containing up to 20 carbon atoms, R is an aliphatic radical having 2 to 6 carbon atoms in the aliphatic chain and X is a salt-forming cation selected from the group consisting of alkali and alkaline earth metals, ammonia, ethanol amines and tetraethylol-ammonium hydroxide radicals, which comprises heating a mixture comprising a salt of an aromatic hydroxy compound, a salt of a halogenated alkanol-sulfuric acid semi-ester, an acid-binding agent and water, at reflux temperatures, and separating the reaction product formed thereby from the reaction mass.

3. The method of producing salts of aryloxyalkanol-sulfuric acid semi-esters having the general structural formula Ar—O—R—O—SO$_2$—OX wherein Ar is an aromatic radical containing up to 20 carbon atoms and having its aromatic nucleus directly attached to the oxygen atom, R is an aliphatic radical having from 2 to 6 carbon atoms in the aliphatic chain, and X is a salt-forming cation selected from the group consisting of alkali and alkaline earth metals, ammonia, ethanol amines and tetraethylol-ammonium hydroxide radicals, which comprises heating a mixture comprising a salt of an aromatic hydroxy compound having the general formula Ar—O—X a salt of a halogenated alkanol-sulfuric acid semi-ester having the general formula

Y—R—O—SO$_2$—OX wherein Ar, R and X represent radicals as above defined and Y is a halogen atom, an acid-binding agent and water, at reflux temperatures, and separating the reaction product formed thereby from the reaction mass.

4. The method of producing salts of aryloxyalkanol-sulfuric acid semi-esters having the general structural formula Ar—O—R—O—SO$_2$—OX wherein Ar is an aromatic radical selected from the group consisting of benzene, substituted benzene and naphthalene radicals, having its aromatic nucleus attached directly to the oxygen atom, R is an aliphatic radical having from 2 to 6 carbon atoms in the aliphatic chain and X is a salt-forming cation selected from the group consisting of alkali metal ions, alkaline alkali earth metal ions and organic bases, which comprises heating a mixture comprising a salt of an aromatic mono-hydroxy compound having the general formula Ar—O—X a salt of a halogenated alkanol-sulfuric acid semi-ester having the general formula

Y—R—O—SO$_2$—OX wherein Ar, R and X represent radicals as above defined and Y is a halogen atom, an acid-binding agent selected from the group consisting of alkali metal hydroxides, alkaline alkali earth metal hydroxides and water, at reflux temperatures, and separating the reaction product formed thereby from the reaction mass.

5. The method of producing phenoxyethyl-sodium sulfate which comprises boiling a mixture of phenol, β-chloroethyl-sodium sulfate, sodium hydroxide and water until substantially the theoretical amount of phenoxyethyl-sodium sulfate is formed, and separating the reaction product from the reaction mass.

6. The method of producing 4-cresoxyethyl-sodium sulfate which comprises boiling a mixture of 4-cresol, β-chloroethyl-sodium sulfate, sodium hydroxide and water until substantially the theoretical amount of 4-cresoxyethyl-sodium sulfate is formed, and separating the reaction product from the reaction mass.

7. The method of producing o-cresoxyethyl-sodium sulfate which comprises boiling a mixture of o-cresol, β-chloroethyl-sodium sulfate, sodium hydroxide and water until substantially the theoretical amount of o-cresoxyethyl-sodium sulfate is formed, and separating the reaction product from the reaction mass.

8. The method of producing 2,4-dichlorophenoxyethyl-sodium sulfate which comprises boiling a mixture of 2-chloroethyl-sodium sulfate, 2,4-dichlorophenol, sodium hydroxide and water until substantially the theoretical amount of 2,4-dichlorophenoxyethyl-sodium sulfate is formed, and separating the reaction product from the reaction mass.

9. The method of producing 4-chloro-2-cresoxyethyl-sodium sulfate which comprises boiling a mixture of 4-chloro-2-cresol, β-chloroethyl-sodium sulfate, sodium hydroxide and water until substantially the theoretical amount of 4-chloro-2-cresoxyethyl-sodium sulfate has been formed, and separating the reaction product from the reaction mixture.

10. The method of producing 4-chlorophenoxybutyl-sodium sulfate which comprises boiling a mixture of 4-chlorophenol, 4-chlorobutyl-sodium sulfate, sodium hydroxide and water until substantially the theoretical amount of 4-chlorophenoxybutyl-sodium sulfate has been formed, and separating the reaction product from the reaction mixture.

11. The method of producing 2-methoxy-phenoxyethyl-sodium sulfate which comprises boiling a mixture of guaiacol, β-chloroethyl-sodium sulfate, sodium hydroxide and water until substantially the theoretical amount of 2-methoxy-phenoxyethyl-sodium sulfate is formed, and separating the reaction product from the reaction mass.

12. The method of producing naphthalene-1-oxyethyl-sodium sulfate which comprises boiling a mixture of α-naphthol, β-chloroethyl-sodium sulfate, sodium hydroxide and water until substantially the theoretical amount of naphthalene-1-oxyethyl-sodium sulfate is formed, and separating the reaction product from the reaction mass.

13. The method of producing β,β-diphenylpropane-4,4′-bis-oxyethyl-sodium sulfate which comprises boiling a mixture of β,β-diphenylolpropane, β-chloroethyl-sodium sulfate, sodium hydroxide and water until substantially the theoretical amount of β,β-diphenylpropane-4,4′-bis-oxyethyl-sodium sulfate is formed, and separating the reaction product from the reaction mass.

14. The method of producing 4-carboxy-phenoxyethyl-sodium sulfate which comprises boiling a mixture of 4-oxybenzoic acid, β-chloroethyl-sodium sulfate, sodium hydroxide and water until substantially the theoretical amount of 4-carboxy-phenoxyethyl-sodium sulfate is formed, and separating the reaction product from the reaction mass.

15. The method of producing 3,5-dimethyl-phenoxyethyl-sodium sulfate which comprises boiling a mixture of 3,5-xylenol, β-chloroethyl-sodium sulfate, sodium hydroxide and water until substantially the theoretical amount of 3,5-dimethyl-phenoxyethyl-sodium sulfate is formed, and separating the reaction product from the reaction mass.

16. The method of producing 4-chloro-3,5-dimethyl-phenoxyethyl-sodium sulfate which comprises boiling a mixture of 4-chloro-3,5-dimethylphenol, β-chloroethyl-sodium sulfate, sodium hydroxide and water until substantially the theoretical amount of 4-chloro-3,5-dimethyl-phenoxyethyl-sodium sulfate is formed, and separating the reaction product from the reaction mass.

17. The method of producing 2,4,6-tribromophenoxyethyl-sodium sulfate which comprises boiling a mixture of 2,4,6-tribromophenol, β-chloroethyl-sodium sulfate, sodium hydroxide and water until substantially the theoretical amount of 2,4,6-tribromo-phenoxyethyl-sodium sulfate is formed, and separating the reaction product from the reaction mass.

18. The method of producing 2,4,6-trichloro-3,5-dimethyl-phenoxyethyl-sodium sulfate which comprises boiling a mixture of 2,4,6-trichloro-3,5-xylenol, β-chloroethyl-sodium sulfate, sodium hydroxide and water until substantially the theoretical amount of 2,4,6-trichloro-3,5-dimethyl-phenoxyethyl-sodium sulfate is formed, and separating the reaction product from the reaction mass.

References Cited in the file of this patent

UNITED STATES PATENTS

| | | |
|---|---|---|
| 1,483,084 | Green et al. | Feb. 12, 1924 |
| 1,644,524 | Hentrich et al. | Oct. 4, 1927 |
| 2,110,847 | De Groote | Mar. 8, 1938 |
| 2,203,883 | Steindorff et al. | June 11, 1940 |
| 2,573,769 | Lambrech | Nov. 6, 1951 |

UNITED STATES PATENT OFFICE
CERTIFICATE OF CORRECTION

Patent No. 2,852,548                                      September 16, 1958

Wolfgang Gündel et al.

It is hereby certified that error appears in the printed specification of the above numbered patent requiring correction and that the said Letters Patent should read as corrected below.

Column 9, lines 49 and 63, for "alkaline alkali earth", each occurrence, read -- alkaline earth --.

Signed and sealed this 3rd day of February 1959.

(SEAL)
Attest:

KARL H. AXLINE
Attesting Officer

ROBERT C. WATSON
Commissioner of Patents